United States Patent
Caron (10) Patent No.: US 7,029,267 B2
(45) Date of Patent: Apr. 18, 2006

(54) REUSABLE VACUUM BAG AND METHODS OF ITS USE

(75) Inventor: Mark C. Caron, Bath, ME (US)

(73) Assignee: Saint-Gobain Technical Fabrics Canada, LTD, Ontario (CA)

( * ) Notice: Subject to any disclaimer, the term of this patent is extended or adjusted under 35 U.S.C. 154(b) by 23 days.

(21) Appl. No.: 10/692,421

(22) Filed: Oct. 23, 2003

(65) Prior Publication Data

US 2005/0086916 A1   Apr. 28, 2005

(51) Int. Cl.
*B29C 70/44* (2006.01)

(52) U.S. Cl. .................. 425/389; 156/382; 442/289

(58) Field of Classification Search .............. 425/389; 442/64, 286, 289; 156/382
See application file for complete search history.

(56) References Cited

U.S. PATENT DOCUMENTS

| | | | |
|---|---|---|---|
| 2,913,036 A | 11/1959 | Smith | |
| 3,146,148 A | 8/1964 | Mitchella et al. | |
| 3,666,600 A * | 5/1972 | Yoshino | 156/382 |
| 4,132,755 A | 1/1979 | Johnson | |
| 4,312,829 A | 1/1982 | Fourcher | |
| 4,483,267 A | 11/1984 | Seemann, III | |
| 4,676,853 A * | 6/1987 | Lerma | 156/87 |
| 4,681,651 A * | 7/1987 | Brozovic et al. | 156/382 |
| 4,702,376 A * | 10/1987 | Pagliaro | 206/524.8 |
| 4,822,436 A | 4/1989 | Callis et al. | |
| 4,842,670 A * | 6/1989 | Callis et al. | 156/382 |
| 4,902,215 A | 2/1990 | Seemann, III | |
| 4,942,013 A | 7/1990 | Palmer et al. | |
| 5,045,251 A | 9/1991 | Johnson | |
| 5,052,906 A | 10/1991 | Seemann | |
| 5,129,813 A * | 7/1992 | Shepherd | 425/504 |
| 5,316,462 A | 5/1994 | Seemann | |
| 5,370,598 A * | 12/1994 | Corneau, Jr. | 493/220 |
| 5,439,635 A | 8/1995 | Seemann | |
| 5,601,852 A | 2/1997 | Seemann | |
| 5,702,663 A | 12/1997 | Seemann | |
| 5,716,488 A * | 2/1998 | Bryant | 156/382 |
| 5,721,034 A | 2/1998 | Seemann, III et al. | |
| 5,807,593 A * | 9/1998 | Thompson | 425/389 |
| 5,837,185 A | 11/1998 | Livesay et al. | |
| 5,874,133 A * | 2/1999 | Cochran | 427/299 |
| 5,904,972 A | 5/1999 | Tunis, III et al. | |
| 5,958,325 A | 9/1999 | Seeman, III et al. | |
| 6,159,414 A | 12/2000 | Tunis, III et al. | |
| 6,257,858 B1 | 7/2001 | Pabsch et al. | |

(Continued)

FOREIGN PATENT DOCUMENTS

JP         03162933 A      7/1991

OTHER PUBLICATIONS

S.T. Peters, Handbook of Composites, 1998, Chapman & Hall, 2nd edition, pp. 556-575, especially p. 569.*

(Continued)

*Primary Examiner*—Robert B. Davis
(74) *Attorney, Agent, or Firm*—Duane Morris LLP (57) ABSTRACT

Reusable vacuum bags are provided which include a fabric layer containing reinforcement fibers and a release surface disposed on at least the first side of the fabric layer. The vacuum bag is capable of withstanding multiple mold cycles of the vacuum of less than ambient pressure without significant leakage. In addition, the described vacuum bag can be used in resin transfer molding and standard bagging operations with commercial benefit.

26 Claims, 3 Drawing Sheets

U.S. PATENT DOCUMENTS 6,367,406 B1   4/2002   Sahr et al.
6,558,608 B1   5/2003   Haraldsson et al.
6,851,945 B1 *   2/2005   Potter et al. ................ 425/389

OTHER PUBLICATIONS

International Search Report in Serial No. PCT/US04/33852.

* cited by examiner

REUSABLE VACUUM BAG AND METHODS OF ITS USE

FIELD OF THE INVENTION

The present invention relates to a reusable vacuum bag for forming polymeric materials, and especially to reusable bags or membranes for use in resin transfer molding and bagging operations.

BACKGROUND OF THE INVENTION

Vacuum bag techniques are well known in the art of making large composites, such as those used in the manufacture of industrial containers and boats. They can involve both dry lay-up and wet lay-up processes. After the fiber reinforcement is laid up on a forming tool or mold surface, a flexible gas impervious sheet, liner, membrane or bag (hereinafter "bag"), is used to form a sealed vacuum envelope over the lay-up. A heat, ambient temperature or light curable catalyzed resin in liquid form is then introduced into the envelope and a vacuum is drawn on the interior envelope space. The vacuum induces an internal collapse of the film envelope against the mold surface and fiber reinforcement so that the resin and reinforcement follow the mold pattern and air pockets and voids are removed. Thereafter, the resin is cured by heat, ambient temperature or UV or ambient light.

Since the bag material restricts the resin from freely flowing though the fiber reinforcement, it has a tendency to trap air and other vapors between the vacuum bag film and the composite structure, a breather fabric with a plastic film which is positioned between the dry lay-up and the inside of the vacuum bag is used to prevent resin from reaching and plugging the vacuum lines in the bag. The breather bag functions to prevent the outer bag from collapsing completely on the lay-up. In addition, a resin distribution medium comprising space-apart plastic protrusions or monofilaments can be used to help distribute the resin without the entrainment of air or other gasses. Such as disclosed in Seemann U.S. Pat. Nos. 5,702,633; 4,902,215; 5,316,462 and 5,052,906, which are hereby incorporated by reference.

Vacuum bags are typically airtight films such as nylon or polyester, for example. One such material, called Quick Draw textured film (polyester thermoplastic Mylar) is transparent to UV light for UV-curable resin systems. Quick Draw film has been used in the preparation of boat hulls as disclosed in Livesay, et al., U.S. Pat. No. 5,837,185, also hereby incorporated by reference. The vacuum bag is discarded after each use. Permanent rubber bags, such as silicone or synthetic rubber have been used by some fabricators, but their high initial cost and handling and storage requirements result in limited and infrequent use by most commercial establishments. Silicone bags are also readily attacked by resin systems used to mold parts. In some cases, artisans have been known to add PTFE films to help overcome resin degradation of silicone bags, but this has been at great cost.

A vacuum bag is usually significantly oversized and has numerous folds so that bridging, or stretching, of the film over an angular area, such as a radius or sharp corner, is eliminated. If bridging occurs, the bag may rupture at high temperature and pressure causing the loss of the part. Vacuum bags are often used with separate non-stick release films and a mold release to prevent the parts from sticking to the tools and to the vacuum bag. The necessity of having both a polymeric vacuum bag film and an additional non-stick release film, as well as a chemical mold release, adds to the cost of bagging operations generally, and resin transfer molding operations in particular. Accordingly, there remains a need in the composites fabrication industry for a reusable vacuum bag which is cost-efficient, and which can withstand multiple mold cycles of a vacuum without significant leakage.

SUMMARY OF THE INVENTION

The present invention provides a reusable vacuum bag for forming polymeric materials which includes a fabric layer containing high strength reinforcement fibers and a release surface disposed on at least a first side of the fabric layer. The vacuum bag is capable of withstanding multiple mold cycles of a vacuum of less than ambient pressure without significant leakage.

The vacuum bags of this invention are reusable and are particularly adapted to bagging operations and resin transfer molding ("RTM") application techniques. The vacuum bags of this invention can permit resin flow through a vein network, such as a infusion tube or mesh disposed below, or integral with, the bag surface. In a preferred embodiment of this invention, the vacuum bag is translucent or transparent so as to permit observation of resin flow, as well as UV-curable or light curable resins to be used. The preferred bags of this invention include fabrics coated, laminated or welded on one side, or both sides, with a release material, such as silicone, fluorocarbon, PPS, PEEK, polyketone, PEI, polyamide resin, or a combination thereof. A contemplated combination is a semi-rigid, three-dimensionally configured, reusable vacuum bag containing a fabric bonded between a pair of "tri-component" fluorocarbon films. A traditional flat two-dimensional vacuum bag containing a fabric having a release surface is also within the scope of the present invention.

The vacuum bags of this invention can be used in conjunction with single use release peal ply, throw away polypropylene resin distribution media, disposable resin feed and bleed "tubing" and butyl "tacky tape" that seals the bag to the male or female molds. These vacuum bags can be used in "scrimp" or vacuum infusion techniques in large or small part volumes. They are also valuable in circumstances where a manufacturer uses a two-sided fiberglass mold in a light resin transfer molding process, or a full high pressure resin transfer molding process with matched metal molds.

In the preferred processes of this invention, the vacuum bags can be used to substitute for three-dimensional un-reinforced silicone vacuum bags. They can further include resin flow channels, vacuum exhaust parts and other features to eliminate disposables and expense.

In a further embodiment of this invention, a three-dimensional bag is provided which can be fitted tightly during the molding of a composite molded part while maintaining some flexibility so as to avoid fiber "bridging". The vacuum bags of this invention can have as many seams as necessary, or none at all, to have a tailored bag fit for the molded part. The bag can withstand multiple cycles of a full vacuum, for example, of at least one bar, without leaking. The vacuum bags of this invention can be sealed to female molds to preserve a vacuum with the standard flange "tacky" tape, or soft silicone, or other reusable rubber seals that can be bonded to the inner surface of the vacuum bag with structural adhesives.

In one aspect of the present invention, the vacuum bags of this invention surface release from the cured thermoset or solidified thermoplastic resin parts in the final composite construction. This has the advantage of eliminating a release layer disposable used in the molding process.

In a further detailed embodiment of the present invention, the vacuum bag can have a bumpy surface, channels, ridges, mesh, or conduits strategically located to be used as part of a resin feed channel or vacuum exhaust port. The vacuum bags of this invention may also have different layers, materials or regions that could allow certain sections to be semi-rigid (relatively thick or stiff panels) while other areas may be thinner, or made of more pliable or of stretchable fabric materials, to allow the bag to fit tightly into small radiuses or around sharp corners. In still further embodiments of the present invention, a vacuum bag is provided which is essentially a double layer bag with baffles built into it so hot air or vapors could be pumped between the two layers to help cure thermosetting composites faster. This baffle system will also have the ability to carry cold water/air that can be used to rapidly cool the composite part once the resin's curing peak exotherm temperature has been reached, reducing the in-mold cycle times for the molding. This can be provided, for example, by using a stiffer bumpy fabric on the inside surface of the outer layer with a thin pliable inner layer that can be vacuum pressed together to create a double bumpy or undulated surface, or by using a more flexible film bonded to an open mesh-type or scrim fabric.

BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

With reference to the figures and particularly to FIGS. 1–5, the description of the preferred vacuum bag 23 in bagging and resin transfer molding operations will now be described. The reusable vacuum bag 23 is composed of a fabric layer 55 having a release surface 60 disposed thereon. The bag 23 is especially useful in molding polymeric materials, such as thermosetting and thermoplastic composites. Such molding operations are known to include standard bagging and resin transfer molding techniques.

Bagging Operation

The term bagging usually refers to the application of a pressure membrane or bag over the part lay-up to provide a transfer medium that allows the autoclave pressure (or vacuum/air pressure for oven cures) to react on the part. The bag is normally a thin plastic film and is normally discarded after each use. The plastic film is significantly oversized and has numerous folds so that bridging, or stretching, of the film over an angular area or a sharp corner is eliminated. If bridging occurs, the bag will rupture at high temperature and pressure, causing the loss of the part. The present invention provides a reusable bag 23 which can reduce the cost of bagging operations.

Figure 1:
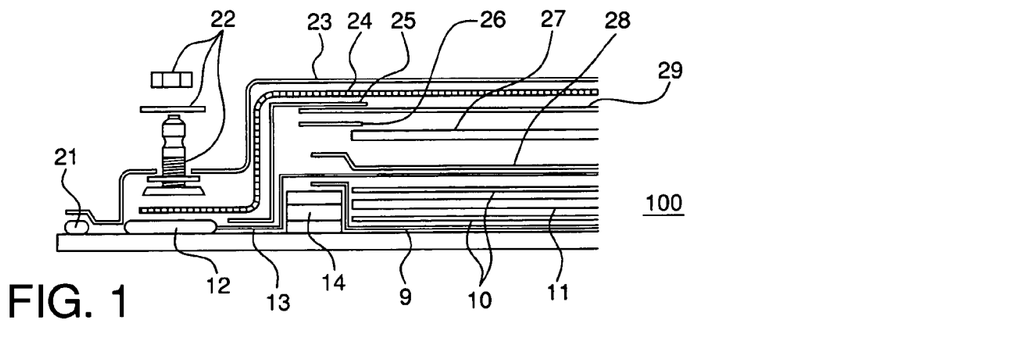
FIG. 1: is a partial cross-sectional side elevation view of a preferred bagging operation employing the novel vacuum bag of this invention.

A bagging lay-up, pursuant to this invention, is shown in FIG. 1. An edge dam is used with no-bleed or low-bleed resin prepreg systems, but is normally omitted on systems with higher resin content. Optional nonstick release films 28 and 29 are used in addition to the mold release to prevent the parts from sticking to the tools. Peel plies 10 made of thin fiberglass or nylon films are applied directly onto the laminates 11 and are ultimately removed or peeled away before bonding, painting, or applying other finishes to the laminate. Several optional bleeder plies of fiberglass cloth, nonwoven nylon cloth, or other absorbent materials 13 are also incorporated and sealed with tape 25 and 26 into the lay-up to absorb any excess resin. Additional plies of bleeder material 24 and/or a caul sheet 27 are placed over the part. A folded and flattened roll of bleeder cloth 12 is placed around the total lay-up just inside the sealing compound 21 to act as a manifold to allow total air evacuation of the cavity under the bag 23.

At this point, thermocouples are placed in the trim area at the edge of the part. They are pressed into the compound, and additional compound is applied. The thermocouple junctions are positioned at areas of the tool and part determined to be thin (low mass) and thick (high mass). The bag 23 is positioned over the lay-up and pressed into the sealing compound 21 at the edge of the part. Generous folds or gathers in the bag 23 are positioned around the part. Where necessary, these folds are sealed with additional compound. Vacuum connections 22 and connections for static lines are placed in the bag 23 and positioned over the perimeter bleeder manifold 12, away from areas of possible resin bleed to avoid blocking them. There are no hard and fast rules for the number of connectors, but usually one static line connection is used and at least one vacuum connection for every 0.93 $m^2$ (10 $ft^2$) of part. With tools having built-in vacuum/static line connections, it is not necessary to place the connectors in the bag 23.

After the bagging operation is completed, full vacuum at room temperature is applied to the bag 23, except in cases in which parts include pressure-sensitive components, such as a lightweight core. In these cases, a proportionately lower vacuum is applied. The vacuum source is then shut off, and leakage is checked by reading the pressure drop on a gage attached to the static line. In production processes, a pressure drop of more than 16.9 kPa (5 in. Hg) in 5 min is considered excessive leakage. When this occurs, the bag 23 must be checked for leaks and resealed or replaced. Leaks can be easily and quickly repaired in a bag by thermally welding on patches of similar fabric. The fabric surface films are preferably thermally weldable polymers, and thus, can be sealed or resealed using a hot press or hot air welding techniques that are commonly known. Several sonic leak detectors are available for locating small bag leaks. Once the leaks are sealed, the lay-up is held under vacuum until it is ready for curing. This prevents movement of the bag and possible bridging. If the vacuum is lost during this period, it should carefully be reapplied and the assembly checked for bridging and leaks.

Most production applications use a pressurized autoclave to apply heat and pressure, but an oven cure with vacuum pressure is sometimes sufficient for small, simple contoured parts. A pressurized autoclave is generally chosen for curing a variety of parts in production quantities. Many newer autoclaves are being built to operate at maximum temperatures of 315 to 425° C. (600 to 800° F.) in order to process the high-temperature polyimide and thermoplastic systems. Most autoclaves operate at 0.69 MPa (100 psig), with a few produced for operation at 1.4 MPa (200 psig). This preferred release surface 60 and fabric 55 materials are of a great benefit to autoclave techniques in that the preferred fluorocarbon film surfaces have a very high melting temperature (500–700° F.) and thus can be used for high temperature applications where silicone bags cannot be used.

The autoclaves are usually pressurized with nitrogen and carbon dioxide from a liquid storage tank, and vaporized. Most autoclaves operate at 0.69 MPa (100 psig), with a few produced for operation at 1.4 MPa (200 psig).

Resin Transfer Molding

Resin transfer molding (RTM) is a closed-mold low-pressure process that allows the fabrication of composites, ranging in complexity from simple, low-performance parts to complex, high-performance articles and in size from small to very large. The process is differentiated from other molding processes in that the dry reinforcement and the resin are combined within the mold to form the composite component. The fiber reinforcement, which may be pre-shaped, is placed into a tool cavity, which is then closed. A tube connects the closed tool cavity with a supply of liquid resin, which is pumped or transferred into the tool to impregnate the reinforcement, which is subsequently cured. Several similar composite fabrication processes fall into the resin transfer molding category, although there are distinct variants.

The most common use of the term RTM describes a process typified by the vacuum-assisted resin injection (VARI) manufacturing process. A mold is constructed of low-cost materials, such as epoxy. Reinforcement is then cut to fit the required geometric pattern and is arranged by hand in the mold. Pieces of reinforcement may be placed in the mold one at a time or preassembled and then placed in the mold as a unit of preform, after which the mold is closed and clamped. A vacuum can then be applied to the mold to extract the air, and resin is injected at very low pressures, often below atmospheric pressure. Because of the low-cost materials used in mold construction, mold pressures must be low, resulting in slow fill times and limited glass contents. The inability of the mold to tolerate elevated temperatures, coupled with its poor heat transfer, restrict the resin chemistry to slow cure times with minimum exotherm to prevent resin degradation or tool damage. Cycle times of this process are measured in hours and days for large, complex parts. The major benefit of the process is the ability to fabricate large, complex structures with maximum part integration at a low cost.

This molding technique offers many potential processing, cost and design advantages over other common composite fabrication methods, including the easy manufacture of complex shapes without high-cost tooling. In many cases, RTM represents the only method available for manufacturing certain complex structures, such as those requiring hand tooling of both inside mold line (IML) and outside mold line (OML) surfaces. This is especially true for stitched lay-ups.

Another advantage of RTM is the ability to build larger net shapes. A large percentage of the cost of producing composite parts comes in the assembly (bonding and fastening) of large numbers of smaller detail parts after they have been fabricated. Since RTM is not limited to the size of an autoclave or by pressure application, novel tooling approaches can be used to produce not only complex contours, but large, complete structures. A further benefit of RTM is that worker exposure to chemical environments can be greatly reduced compared to other systems of composite manufacturing.

Examples of typical RTM manufactured parts are categorized in the following Table 1.

TABLE 1

Typical parts currently manufactured using RTM

| Use | Part |
| --- | --- |
| Industrial | Solar collectors |
|  | Electrostatic precipitator plates |
|  | Fan blades |
|  | Business machine cabinetry |
|  | Water tanks |
| Recreational | Canoe paddles |
|  | Boats |
|  | Television antennae |
|  | Snowmobiles |
| Construction | Seating |
|  | Bathtubs |
|  | Roof sections |
| Aerospace | Airplane wing ribs |
|  | Cockpit hatch covers |
|  | Airplane escape doors |
| Automobile | Crash members |
|  | Leaf springs |
|  | Car bodies |
|  | Bus shelters |

Part consolidation can be easily accomplished by placing inserts or fittings, along with the reinforcement, into the mold in a single operation. Reinforcements can be "preformed" into the appropriate lay-up sequence and shape, chemically or mechanically bonded to maintain integrity, and placed into the mold as single or multiple units. Composites with high fiber volumes (>60 vol %) can be made in this fashion. Resin transfer molding also allows relatively fast cycle times, highly reproducible part dimensions, good surface definition and appearance, good quality control, low clamping pressure, easily learned operator skills, and low capital investment, as opposed to other techniques, such as hand lay-up (prepreg). Resin transfer molding can also be highly automated to reduce production costs.

Material considerations for RTM include tooling, resin pumping/dispensing equipment, mold releases and cleaner, resin selection, and reinforcements.

Mold design and construction are the most critical factors in the successful use of the RTM process. The mold itself may be broken down into five major areas: the injection port(s), the air vent(s), the guide pins, the mold cavity, and the bag or gasket. The injection port(s) and air vent(s) provide resin access to the mold and a means for removing volatiles and trapped air from the part. The guide pins (optional) ensure the proper alignment of the mold halves. The mold cavity imparts the desired shape to the part, while the gasket seals the mold and restricts resin flow out of it. Two other important considerations in mold design and construction are surface finish of the mold cavity and The type of mold release and mold cleaner to be used as process aids also must be considered. Neither the mold release agent nor the mold cleaner should affect the quality of the part or mold surface. Mold release agents take many forms, such as waxes; silicon and silicone sprays; and polyvinyl chloride, polyester, or polyimide films. The selection depends on the type of resin, the molding conditions, and the tooling material used. Gel coats are also often used to achieve good surface characteristics. Compatibility with part materials is the key factor. Generally, mold cleaners are common, environmentally acceptable solvents for the resin system and/or mold release agent being used. Two examples are acetone and methylene chloride.

Pumps, rams, and air lines can all be utilized to apply the necessary force to transfer the resin into the closed mold. In addition, a vacuum is often desirable to remove air from the mold cavity before and during resin injection. Multi-component resin systems require accurate metering, mixing heads, and/or static mixers to bring the components together and provide adequate mixing. Temperature control is important for reproducibility. Once the resin system is mixed, a probe can be designed in consort with the injection port(s) on the mold to permit resin flow into the mold. Finally, a flushing system is necessary to prevent resin gelation in the transfer system. Materials for construction of this type of equipment are described in the literature.

Resin Selection

Although a resin system selection should be based primarily on the performance requirements of the end-use application, there are several key characteristics specific to the selection of a resin system for RTM and bagging operations. The term resin system in this context will refer to everything needed to make the system suitable for the desired processing and for the end-use application. This includes the resin, curing agent, catalysts, fillers, pigments, promoters, and inhibitors. The available choices for a resin system tend to fall into certain application/performance areas and resin types/characteristics. These are outlined in the following Table 2.

TABLE 2

Application areas generally associated with generic resin types, based on performance characteristics

| Resin type | Applications | Typical neat resin properties |
| --- | --- | --- |
| Polyester | Consumer products, tanks, pipes, pressure vessels, automotive structures | Tensile strength of 3.4 to 90 MPa (0.5 to 13 ksi); compressive strength of 90 to 210 MPa (13 to 30 ksi); up to 120° C. (250° F.) continuous use; low viscosity; fast reaction; can be catalyzed; high shrinkage |
| Vinyl ester | Consumer products, pipes, ducts, stacks, automotive structures, flooring, linings | Tensile strength of 60 to 90 MPa (9 to 13 ksi); elongation of 2–6%; up to 120° C. (250° F.) continuous use; low viscosity; fast reaction; can be catalyzed; intermediate shrinkage |
| Polybutadiene | Resin modifiers, coatings, adhesives, potting compounds | Good chemical resistance; up to 120° C. (250° F.) continuous use; high viscosity; fast reaction; can be catalyzed; low moisture pick-up |
| Epoxy | Adhesives, tooling, electronics, aerospace and automotive structures | Tensile strength of 55 to 130 MPa (8 to 19 ksi); excellent chemical resistance; up to 175° C. (350° F.) continuous use; high viscosity; can be catalyzed; intermediate reaction; low shrinkage |
| Polyimide | Primary and secondary aerospace structures in high-temperature areas, electronics | Tensile strength of 55 to 120 MPa (8 to 17) ksi); up to 315° C. (600° F.) continuous use; high viscosity; can be catalyzed; slow reaction; reaction by-products; microcracking |

TABLE 2-continued

Application areas generally associated with generic resin types, based on performance characteristics

| Resin type | Applications | Typical neat resin properties |
| --- | --- | --- |
| Bismaleimide | Similar to polyimide | Similar to polyimide, except that continuous use only up to 230° C. (450° F.); no reaction by-product |
| Low-performance thermoplastic | Automotive panels, appliance housing, gears, bearings, fixtures, consumer products | Amorphous or semicrystalline; high toughness; up to 120° C. (250° F.) continuous use; high processing temperatures and pressures; high viscosity |
| Engineering-grade thermoplastic | Automotive and aerospace structures | High toughness; up to 230° C. (450° F.) continuous use; high processing temperatures and pressures; high viscosity; amorphous or semicrystalline |

Reinforcement Selection

As with the resin system, the selection of the appropriate reinforcement (including veils and surface mats) is primarily governed by the performance and cost requirements of the end-use application. However, there are several important mechanical, processing, and fiber characteristics that also influence the choice of reinforcement. These attributes are the physical form of the reinforcement, the base fiber material, the sizing (if any), and the type of stitching.

The predominant fiber materials are boron, aramid, ceramic, glass (S-glass, E-glass), carbon and graphite, glass and graphite being the most common. Graphite provides the best property performance with respect to its weight, and is used in applications such as aerospace parts, where reduced weight and high-performance characteristics are dominant factors. However, it is also more costly than glass or aramid. Glass is often used in parts with lower cost and property performance requirements, such as boat hulls, automotive, industrial, and consumer products. Boron exhibits high-performance properties that exceed those of most graphite fibers, but it is very expensive to manufacture and has a greater density, which results in a heavier part. Ceramic fibers are useful primarily for very high temperature applications, and although they provide excellent mechanical properties, are very brittle and relatively expensive. Neither boron nor ceramic fibers are used much at this time, but as temperature and property requirements increase particularly in aerospace applications, they may become more important.

The effect of fiber sizing on composite properties is an important issue. As higher-temperature/performance resins and fibers are developed, there is a greater need for well-understood interfacial characteristics. Sizing is intended to improve the handling of the fiber bundles as well as to provide a bond between the reinforcement and the matrix, thereby enhancing physical properties. Therefore, the use of sizing and the type of sizing to be used become important to the overall performance of the composite part. Typically, most commercial fiber sizings are epoxy or epoxy-silanes, but others are available that are designed for the chemical characteristics of the resin system of interest.

Finally, the manner in which preforms and fabrics are made and held together is also important, particularly in high-volume production. The most common method used is stitching, which is intended to maintain orientation of the individual fiber tows or to keep reinforcement plies together while handling. Benefits include better interlaminar shear properties, damage tolerance, and fiber alignment. For graphite fabrics, polyester stitching is commonly used. Other techniques for holding fibers or fiber forms together include adhesives or other types of chemical bonding and physical attachments, such as staples or braiding. Compatibility of the resin-fiber combination is the key to good performance in composites that are made by the RTM and bagging processes.

Bag Construction

Figure 2:
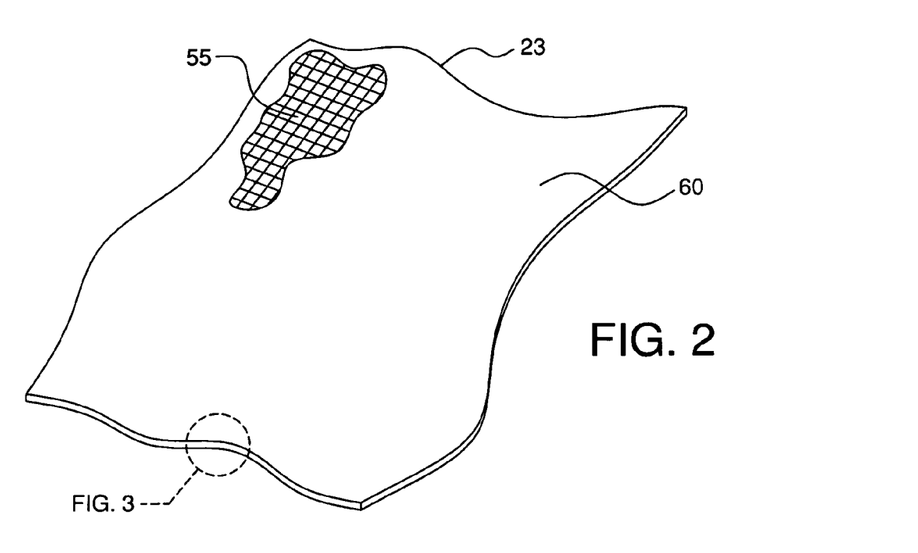
FIG. 2: is a front perspective view of a preferred vacuum bag of this invention showing, in partial peel-away view, a fabric layer.
Figure 3:
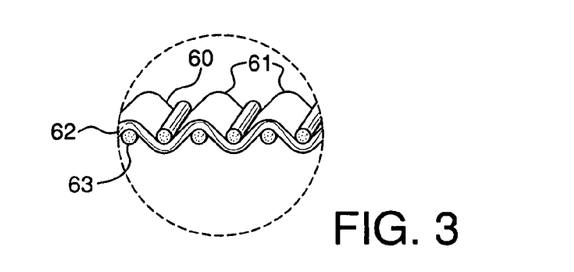
FIG. 3: is a magnified view of a front edge portion of the vacuum bag of FIG. 2.

With particular reference to FIG. 2, a reusable vacuum bag 23 is provided which contains a fabric layer 55. The vacuum bag 23 also includes a release surface 60 disposed on at least a first side of the fabric layer 55. As shown in FIG. 3, the release surface 60 can be a polymeric coating on one side of a fabric layer 55. The release surface 60 can include one or more nubs, bumps, channels, conduits or protrusions for facilitating the flow of air, vapors or resin into and out of the molding area. Although the release surface is shown as a coating FIG. 3, it could equally be a resin material which impregnates the fabric layer 55, the weft yarns 63 or warp yarns 62 of a woven, knitted or braided embodiment of the fabric layer 55, or coats individual fibers or yarns. The release surface 60 could also be fibers or yarns having a low coefficient of friction, that are interlaced or comprise a portion, or all, of the fabric layer 55, so as to present a release surface on at least the first side, or both sides, of the bag 23. Additionally, the release surface 60 could be particles, loose fibers, or a liquid which adheres to, or impregnates, the first side of the fabric layer.

Fabric Portion

The fabric layer 55 of this invention can be any number of woven, braided, needled, knitted, or non-woven materials, such as air-laid, spun-bonded, or melt blown fabrics, films, laid-type material such as scrim, or composite materials. They are preferably constructed using textile fibers, such as nylon and polyester or high strength reinforcement fibers, such as aramid, glass, graphite or carbon fibers, such as E-glass, S-glass, or Kevlar® aramid fibers available from E.I. DuPont, Wilmington, Del.

Fabrication Process

Once the continuous glass fibers have been produced they must be converted into a suitable fabric for their intended application. The major finished forms are continuous roving, woven roving, fiberglass mat, chopped strand, and yarns for textile applications.

Fiberglass, E-glass, S-glass, ECR-glass, etc., roving is produced by collecting a bundle of strands into a single large strand, which is wound into a stable, cylindrical package. This is called a multi-end roving process. The process begins by placing a number of oven-dried forming packages into a creel. The ends are then gathered together under tension and collected on a precision roving winder that has constant traverse-to-winding ratio, called the waywind.

Roving are used in many applications of this invention. Woven roving is produced by weaving fiberglass roving into a fabric form. This yields a coarse product that is easier to coat or impregnate, such as with the preferred low friction polymers disclosed herein, since these materials can bind to the coarse fibers easily. Plain or twill weaves are less rough, thereby being easier to handle without protective gloves, but will absorb resins. They also provide strength in both directions, while a unidirectionally stitched or knitted fabric provides strength primarily in one dimension. Many novel fabrics are currently available, including biaxial, double bias, and triaxial weaves for special applications.

Combinations of fiberglass mat, scrim, chopped fibers and woven or knit filaments or roving can also be used for the fabric of this invention. The appropriate weights of fiberglass mat (usually chopped-strand mat) and woven roving filaments or loose chopped fibers are either bound together with a chemical binder or mechanically knit, needled felted or stitched together. These facing materials can have uniform porosity or non-uniform porosity in either the x, y, or z planar directions. Alternatively, the release surface coating or saturant, such as a latex resin or wetting or non-wetting agent, can be unevenly applied through the fabric thickness.

Fiberglass paper can also be used for the fabric of this invention. Chopped strands of 25 to 50 mm (1-to 2-in.) lengths are usually used in making fiberglass paper. In this process, chopped fibers are dispersed in a water to form a dilute solution. The fiberglass strands filamentize during the mixing and dispersion process. The solution is pumped onto a continuously moving chain or belt, where most of the water is removed by vacuum, leaving behind a uniformly distributed, thin fiberglass mat. A binding resin is added on-line, followed by drying and curing, to form the fiberglass paper. Although possessing a lower mechanical strength than woven glass fabric, glass paper is cheaper to make.

The yarns of the facing layers of this invention can be made by conventional means. Fine-fiber strands of yarn from the forming operation can be air dried on forming tubes to provide sufficient integrity to undergo a twisting operation. Twist provides additional integrity to yarn before it is subjected to the weaving process, a typical twist consisting of up to one turn per inch. In many instances heavier yarns are needed for the weaving operation. This is normally accomplished by twisting together two or more single strands, followed by a plying operation. Plying essentially involves retwisting the twisted strands in the opposite direction from the original twist. The two types of twist normally used are known as S and Z, which indicate the direction in which the twisting is done. Usually, two or more strands twisted together with an S twist are plied with a Z twist in order to give a balanced yarn. Thus, the yarn properties, such as strength, bundle diameter, and yield, can be manipulated by the twisting and plying operations. Fiberglass yarns are converted to fabric form by conventional weaving operations. Looms of various kinds are used in the industry, but the air jet loom is the most popular.

Zero twist-yarns may also be used. This input can offer the ease of spreading of (twistless) roving with the coverage of fine-filament yarns. The number of filaments per strand used directly affect the porosity and are related to yarn weight as follows: $n=(490 \times Tex)/d^2$, where "d" is the individual filament diameter expressed in microns. Thus, if the roving with coarse filaments can be replaced with near zero twist yarn with filaments half the diameter, then the number of filaments increases by a factor of 4 at the same strand Tex.

The major characteristics of the woven facing embodiments of this invention include its style or weave pattern, fabric count, and the construction of warp yarn and fill yarn. Together, these characteristics determine fabric properties such as drapability and performance in the bag or liner. The fabric count identifies the number of warp and fill yarns per inch. Warp yarns run parallel to the machine direction, and fill yarns are perpendicular.

There are basically four weave patterns: plain, basket, twill, and satin. Plain weave is the simplest form, in which one warp yarn interlaces over and under one fill yarn. Basket weave has two or more warp yarns interlacing over and under two or more fill yarns. Twill weave has one or more warp yarns over at least two fill yarns. Satin weave (crowfoot) consists of one warp yarn interfacing over three and under one fill yarn, to give an irregular pattern in the fabric. The eight harness satin weave is a special case, in which one warp yarn interlaces over seven and under one fill yarn to give an irregular pattern. In fabricating a molded part, the satin weave gives the best conformity to complex contours, such as around corners, followed in descending order by twill, basket, and plain weaves.

Texturizing is a process in which the textile yarn is subjected to an air jet that impinges on its surface to make the yarn "fluffy". The air jet causes the surface filaments to break at random, giving the yarn a bulkier appearance. The extent to which this occurs can be controlled by the velocity of the air jet and the yarn feed rate. An equivalent effect can be produced by electrostatic or mechanical manipulation of the fibers, yarn s or roving.

Fabric Design

The fabric pattern, often called the construction, is an x, y coordinate system. The y-axis represents warp yarns and is the long axis of the fabric roll (typically 30 to 150 m, or 100 to 500 ft.). The x-axis is the fill direction, that is, the roll width (typically 910 to 3050 mm, or 36 to 120 in.). Basic fabrics are few in number, but combinations of different types and sizes of yarns with different warp/fill counts allow for hundreds of variations.

Basic fabric structures include those made by woven, non-woven and knit processes. In this invention, one preferred design is a knit structure in which both the x axis strands and the y axis strands are held together with a third strand or knitting yarn. This type of knitting is weft-inserted-warp knitting. If an unshifted tricot stitch is used, the s and y axis strands are the least compressed and, therefore, give the best coverage at a given a real weight. This structure's coverage can be further increased, i.e., further reduction in porosity, by using near-zero-twist-yarn or roving which, naturally, spreads more than tightly twisted yarn. This design can be further improved by assisting the spreading of filaments by mechanical (needling) means, or by high-speed air dispersion of the filaments before or after fabric formation.

The most common weave construction used for everything from cotton shirts to fiberglass stadium canopies is the plain weave. The essential construction requires only four weaving yarns: two warp and two fill. This basic unit is called the pattern repeat. Plain weave, which is the most highly interlaced, is therefore the tightest of the basic fabric designs and most resistant to in-plane shear movement. Basket weave, a variation of plain weave, has warp and fill yarns that are paired: two up and two down. The satin weave represent a family of constructions with a minimum of interlacing. In these, the weft yarns periodically skip, or float, over several warp yarns. The satin weave repeat is x yarns long and the float length is x-1 yarns; that is, there is only one interlacing point per pattern repeat per yarn. The floating yarns that are not being woven into the fabric create considerable loose-ness or suppleness. The satin weave produces a construction with low resistance to shear distortion and is thus easily molded (draped) over common compound curves. Satin weaves can be produced as standard four-, five-, or eight-harness forms. As the number of harnesses increases, so do the float lengths and the degree of looseness making the fabric more difficult to control during handling operations. Textile fabrics generally exhibit greater tensile strength in plain weaves, but greater tear strength in satin weaves. The ultimate mechanical properties are obtained from unidirectional-style fabric, where the carrier properties essentially vanish when coated with a polymer. The higher the yarn interlacing (for a given-size yarn), the fewer the number of yarns that can be woven per unit length. The necessary separation between yarns reduces the number that can be packed together. This is the reason for the higher yarn count (yarns/in.) that is possible in unidirectional material and its better physical properties.

A plain weave having glass weft and warp yarns or roving, in a weave construction is known as locking leno, which is used only in special areas of the fabric, such as the selvage, and is woven on a shuttleless loom. The gripping action of the intertwining leno yarns anchors or locks the open selvage edges produced on rapier looms. The leno weave helps prevent selvage unraveling during subsequent handling operations. However, it has found applications where a very open (but stable) weave is desired.

The design of glass fabrics suitable for this invention begins with only a few fabric parameters: type of fiber, type of yearn, weave style, yarn count, and a real weight.

Fiber finish is also important because it helps lubricate and protect the fiber as it is exposed to the sometimes harsh weaving operation. The quality of the woven fabric is often determined wholly by the type and quality of the fiber finish. The finish of choice, however, is usually dictated by end-use and resin chemistry, and can consist of resinous materials, such as epoxy.

The following fabric styles and categories are useful in the practice of this invention:

| Fabric | Areal wt. | |
| --- | --- | --- |
|  | grams/m$^2$ | oz/yd$^2$ |
| Light weight | 10–35 | 3–10 |
| Intermediate weight | 35–70 | 10–20 |
| Heavy weight | 59–300 | 15–90 |

| Fabric | Thickness | |
| --- | --- | --- |
|  | μm | mil |
| Light weight | 25–125 | 1–5 |
| Intermediate weight | 125–250 | 5–10 |
| Heavy weight | 250–500 | 10–20 |

If woven or knitted, the fabric 55 can contain warp yarns 62 and weft yarns 63 of the same or different weights, using the same or different, number or composition of fibers. The reinforcing fibers can also be mixed with non-reinforcing fibers, such as elastic or more flexible fibers for creating performable or pliable portions of the vacuum bag 23. As such, the vacuum bags 23 can include semi-rigid, or flexible or performable structures, or both. In the instance where the vacuum bag 23 includes a semi-rigid layer, the semi-rigid layer can contain a three dimensional mold surface for assisting in forming the final composite dimensions, such as in the case of near "net" shape fabrication techniques. Semi-rigidity can be created by coating, impregnating or laminating the fabric with a thermoplastic or thermosetting resin, which is hardened or set to help the fabric form its final shape. This resin could be the same or a different formulation than the resin used in the release surface 60, or those disclosed for the molded parts earlier in this description. The vacuum bag 23 may also include a peripheral flat flange configured to mate with a perimeter of a male or female mold.

The vacuum bag 23 of this invention can also be made translucent or transparent for permitting the observance of resin flow and for enabling UV and light curing resins to cure within the vacuum bag.

Release Surface Portion

The release surface 60 of this invention preferably is a coating or material which impregnates the fabric layer 55 to present a surface which is non-stick or easily removed from the formed composite after molding. The frictional properties of polymeric materials depend upon the load, viscosity, temperature and surface finish of the molded part. A low coefficient or friction is generally a good relative measure of release capability. Some low friction materials include acetal, ABS, phenolic, nylon 6/6, polycarbonate, polyester, PEEK, polyetherimide, polyethersulphone, polyethylene, polyimide, modified PPO, PPS, polypropylene, polystyrene, polyurethane, fluorocarbon, carbon, aramid and graphite.

The best high temperature wear resistance can be provided by resin materials including PPS, PEEK, polyketones, PEI, polyimides and fluoroplastic resins, such as PTFE, FEP, ETFE, PVDF, ECTFE and PFA. In addition, $MoS_2$ serves as a good release surface. Solid and liquid lubricants can also be used alone, or in combination with, the above resins materials, and include soaps, fats, waxes, Teflon®, polyethylene, methacrylates, silicone, indium, tin, led, silver, AX, $AX_2$, oxides, sulfides, chlorides, and glasses, such as $B_2O_3$, $PbO$—$SiO_2$, and $PO_4$.

In one preferred embodiment of the release surface 60, a thin PTFE coating of approximately less than 20 microns, and preferably about 1–5 microns, is heat or adhesively bonded to the fabric layer 55. In the preferred embodiment, the release surface 60 has a coefficient of friction (dynamic at 40 PSI and 50 FPM) of no greater than about 0.4, and preferably less than 0.25.

In more preferred embodiments of this invention, a woven light weight fabric of Kevlar® or glass, weighing about 1–5 oz/yd$^2$, and having a thickness of about 5–15 mil, is coated with a "tri-component" or "multi-component" film on both sides. The tri-component film includes an intermediate layer of PTFE sandwiched between two FEP layers to create a total film thickness of approximately 1.5 mil. The woven Kevlar® or glass layer is disposed between two layers of this tri-component film and welded together with heat and/or pressure. The FEP layers have a lower melting point than the PTFE layers, and act as a glue to adhere the tri-component layers to the Kevlar® or glass fibers in the woven fabric. The PTFE layer, having a higher melting point, preferably does not altogether melt, and contributes to the low air permeability, or air tightness of the bag. Alternatively, a nonwoven fabric, such as a polyester fleece, can be used to increase flexibility, and to provide for more elasticity, or at least, stretchability.

In further preferred embodiments of this invention, the bag 23 can be made with different regions having different structural net-shapes, flexibility, and/or stretchiness. Portions of the bag may also be transparent by employing a more open fabric, such as a scrim, which will present open spaces which can be coated or adhered to transparent or translucent films. For example, FEP layers are generally clear, and PTFE layers are milky white. The tri-component layers described above are, thus, translucent and provide inspection of resin flow, and enable light-curable resins to be used. Additionally, if a scrim is open enough, a drawn vacuum can pull a film layer toward the vacuum space in between the fibers of the scrim, to create a bumpy surface without an added undulated layer. Finally, windows can be made in the bag to make them transparent or translucent in selected areas, by combining different film-fabric combinations selected from those described above.

EXAMPLE A

Figure 4:
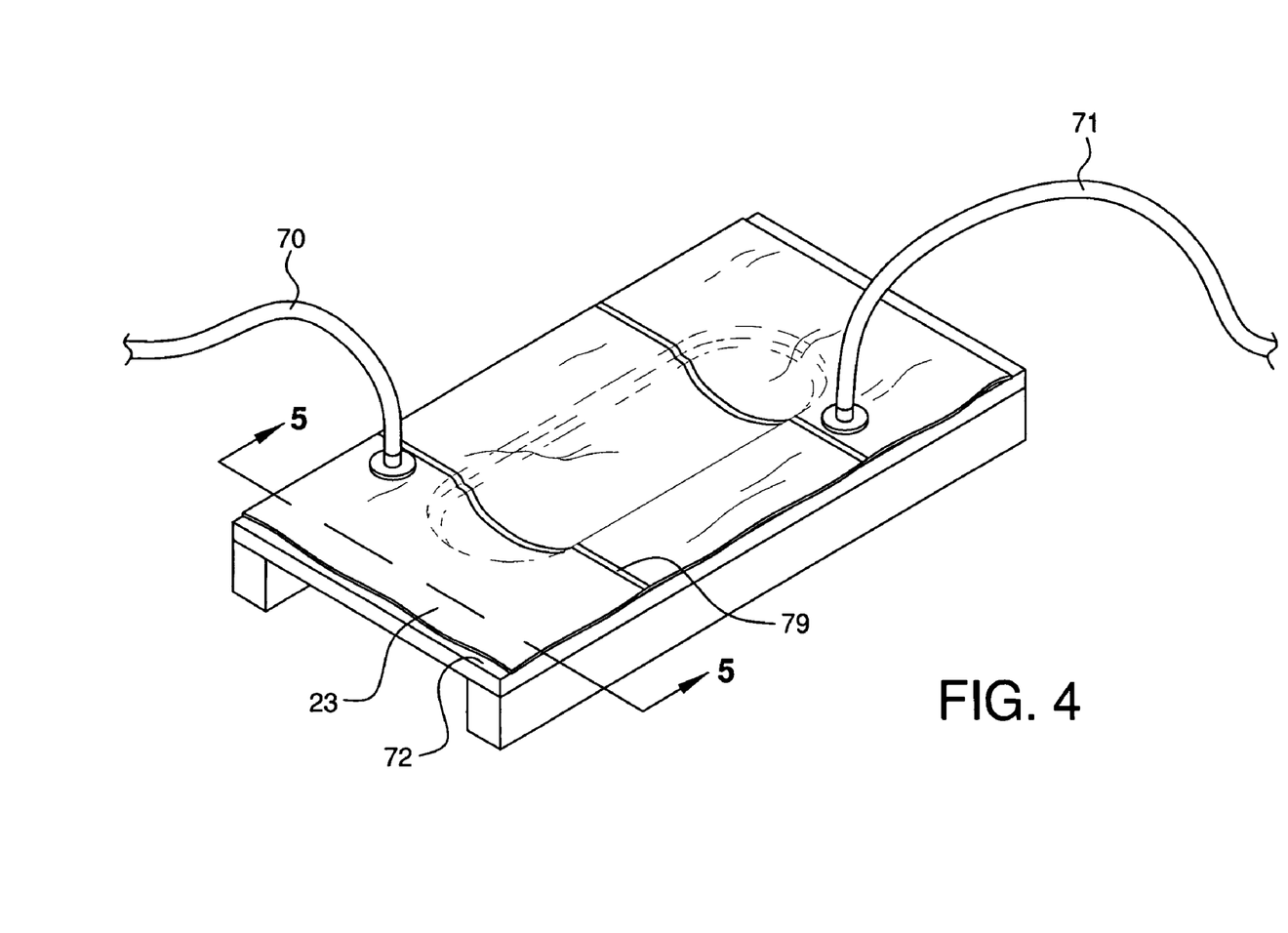
FIG. 4: is a front elevational view of a resin transfer molding process employing the vacuum bag of FIG. 2.
Figure 5:
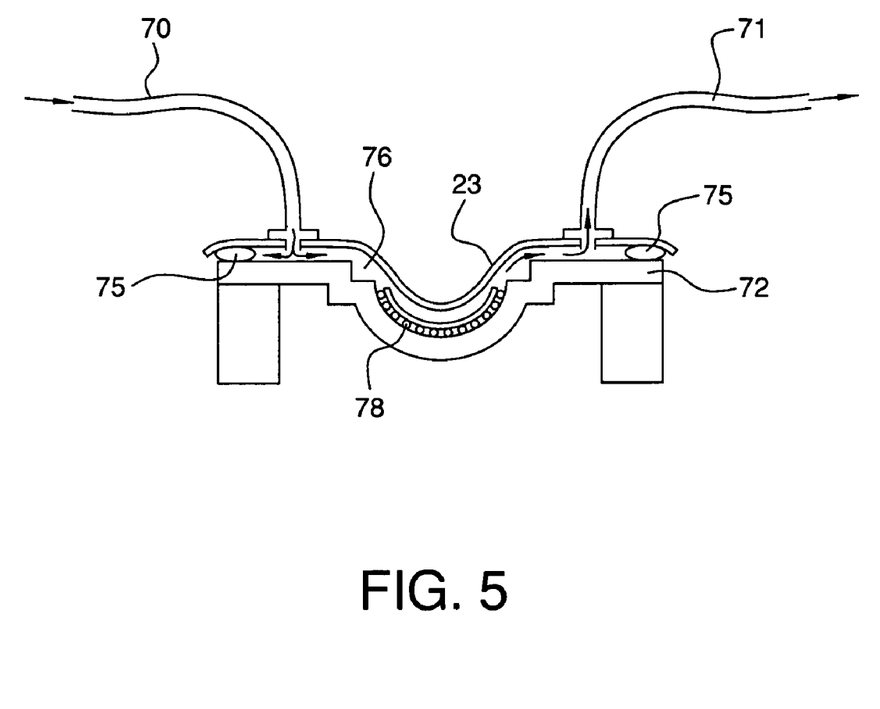
FIG. 5: is a cross-sectional side elevation view, taken through line 5—5, of the resin transfer molding process of FIG. 4.

With respect to FIGS. 4 and 5, an example of preferred resin transfer molding operation using the reusable vacuum bag 23 of this invention is described. The bag 23 can be made of a 3.5 oz/yd$^2$ plain weave, woven Kevlar® fabric with a multi-layered PTFE/FEP coated resin film thermally bonded to, and/or melted into, one or both surfaces of the woven fabric. This base fabric is a Saint-Gobain Performance Plastics, Merrimack, N.H., fabric style "X-22 Natural", that we had developed for the prototype vacuum bags. This is just one of the many fabrics useful for this application. The resin and catalyst may be mixed just prior to introduction into the envelope formed between the vacuum bag 23 and the mold 72. The catalyst can include a conventional heat reactive or ambient temperature reactive catalyst or any conventional photoinitiator and/or photosensitizer, depending upon the dynamics of the thermosetting system. Alternatively, a melted thermoplastic material could be employed. The mold 72 can, for example, be a standard fiber glass boat hull mold. The vacuum bag 23 can include a injection pipe 70 and vacuum pipe 71 with known fittings for adhering to the bag surface. One or more mesh resin transfer veins 79 can be established, such as by a melt bond to the part facing side of the vacuum bag 23. Additionally, a plurality of nubs 61 (shown in FIG. 3) can be formed on the vacuum bag for assisting in resin flow and vapor transfer. The mold 72 can be prepared with a gel coat which is sprayed into the mold 72 and allowed to cure until it is not sticky to the touch. Pre-cut dry reinforcement fibers or layers 78 can be placed into the mold 72 in the shape of the part to be made. The vacuum bag 23 is laid over the mold 72 and folded or generally conformed into the mold 72 and laid out around the flange area. Adhesive compound 75, such as "tacky tape", is laid around the edges of the flanges and the input and output ports, and the vacuum bag 23 is adhered to the tape using standard vacuum bagging techniques.

The bag is allowed to fall generally into the depression 76 of the mold and may touch, or be separated from, the fiber layer 78. Vacuum is then applied to the outlet side or vacuum pipe 71 to a minimum of at least of one bar, and a maximum of about 28 inches of mercury. The air is evacuated from the mold area. The mold 72, seal compound 75 and bag 23 are checked to ensure that there are no leaks, and then the resin valve is slowly opened to allow the resin to enter through injection pipe 70 and into the mold 72 to wet out the fiber layer 78. Air left behind by the flowing resin is evacuated and pulled to the surface of the vacuum bag 23. It is then drawn along the inside surface of the vacuum bag and evacuated. This process can be expedited by the addition of integral channels in the film, formed by the mesh 79 or nubs 61, for example. Upon the infusion of a pre-selected amount of resin to the mold 72, the resin valve is closed, while the vacuum pipe 71 is allowed to remain open to allow full wetting of the fiber layer 78 and consolidation of the composite part. When the composite part is sufficiently consolidated, it is then cured, such as by heating, or UV light. After curing, the vacuum bag 23 is easily removed from the mold 72, due to its release surface 60, and the composite part is processed in a normal matter. The bag 23 can then be reused since it is made of a tough resilient fabric.

For the foregoing, it can be seen that this invention provides bags, bagging techniques, and processing methods for producing formed thermoplastic and thermosetting composites. The vacuum bags of this invention can be used in standard bagging and resin transfer molding operations, for example, and are designed to be reusable. Because of their inexpensive fabric construction, the vacuum bags of this invention have great strength and flexibility, yet are cost effective to manufacturer and compete favorably with former nylon or silicone bags. They can be impregnated with resins in addition to the release material, to provide multiple structures to create three dimensional mold surfaces, or can be impregnated or interwoven with pliable or elastic materials to make them flexible, pliable and easily manipulated around sharp corners, for example. Although various embodiments have been illustrated, this is for the purpose of describing and not limiting the invention. Various modifications, which will become apparent to a skilled artisan, are within the scope of this invention as set forth in the attached claims.

The invention claimed is:

1. A vacuum bag for forming a vacuum envelope over one or more polymeric materials being formed against a mold, comprising:
   a) a fabric reinforced with flexible reinforcement fibers to withstand multiple mold cycles, the fabric having a flexible portion and a semi-rigid section; and
   b) a chemically non-reactive and non-adhering material forming a release surface to separate said fabric from the polymeric material being formed against the mold.

2. The vacuum bag of claim 1 wherein the chemically non-reactive and non-adhering material forming said release surface comprises, a resin of: silicone, fluorocarbon, PPS, PEEK, polyketone, PEI, polyamide, or a combination thereof.

3. The vacuum bag of claim 2 wherein said resin of fluorocarbon comprises: PTFE, FEP, ETFE, PFDV, ECTPF, PFA, or a combination thereof.

4. The vacuum bag of claim 1 wherein said fabric comprises fibers of aramid, glass, graphite, carbon, or a combination thereof.

5. The vacuum bag of claim 1 wherein said chemically non-reactive and non-adhering material further comprises, fibers, a coating or a layer.

6. The vacuum bag of claim 1 wherein said fabric comprises a woven or nonwoven fabric.

7. The vacuum bag of claim 1, wherein said fabric comprises two fabric layers providing a double layer vacuum bag.

8. The vacuum bag of claim 1, wherein the chemically non-reactive and non-adhering material has a shape to distribute the flow of the polymeric material during formation thereof.

9. The vacuum bag of claim 1 wherein the chemically non-reactive and non-adhering material comprises a network of veins to distribute the flow of the polymeric material during formation thereof.

10. The vacuum bag of claim 1 wherein, the chemically non-reactive and non-adhering material forming said release surface is bonded to both sides of said fabric layer.

11. The vacuum bag of claim 1 wherein the flexible portion comprises relatively thin, or pliable, fabric material.

12. The vacuum bag of claim 1 wherein the semi-rigid section comprises relatively stiff, or relatively thick, fabric material.

13. The vacuum bag of claim 12 wherein said semi-rigid section has a three dimensional mold surface.

14. The vacuum bag of claim 1 further comprising an integral flat flange along a perimeter of the vacuum bag.

15. The vacuum bag of claim 14 wherein said integral flat flange is configured to mate with a perimeter of the mold.

16. The vacuum bag of claim 1 wherein said fabric comprises a translucent or transparent material for observance through said fabric and for passage of UV light through said fabric.

17. The vacuum bag of claim 1 wherein said fabric further comprises one or more resin feed channels.

18. The vacuum bag of claim 1, further comprising: one or more vacuum exhaust ports extending through the fabric.

19. The vacuum bag of claim 1, wherein said chemically non-reactive and non-adhering material comprises a tri-component fluorocarbon film heat-bonded to said fabric layer.

20. The vacuum bag of claim 19, wherein said tri-component fluorocarbon film comprises a FEP-PTFE-FEP composite film.

21. A vacuum bag comprising:
   a fabric layer reinforced with high strength reinforcing fibers to withstand multiple mold cycles of a vacuum of less than ambient pressure without significant leakage;
   each side of said fabric layer having a corresponding non-stick fluorocarbon-based release layer bonded thereto; and
   said vacuum bag forming a shaped cavity for shaping polymeric materials against a mold.

22. The vacuum bag of claim 21, wherein each corresponding release layer comprises a tri-component fluorocarbon film heat-bonded to respective major surfaces of said fabric layer.

23. The vacuum bag of claim 22, wherein each tri-component fluorocarbon film comprises a FEP-PTFE-FEP composite film.

24. The vacuum bag of claim 21, further comprising: the fabric layer having a flexible portion and a semi-rigid section.

25. The vacuum bag of claim 24, wherein the flexible portion comprises relatively thin, or pliable, fabric material.

26. The vacuum bag of claim 24, wherein the semi-rigid section comprises relatively stiff, or relatively thick, fabric material.

* * * * *